United States Patent [19]

Lammers et al.

[11] Patent Number: 5,352,474
[45] Date of Patent: Oct. 4, 1994

[54] STABILIZED, WHIPPABLE NON-DAIRY CREAMS

[75] Inventors: Jannes G. Lammers, Ganderkesee, Fed. Rep. of Germany; Hendrik Dijkstra, Maassluis, Netherlands; Ian M. Kimsey, Radwell; Malcolm G. Jones, Stevington, both of Great Britain

[73] Assignee: Unilever Patent Holdings B.V., Vlaardingen, Netherlands

[21] Appl. No.: 29,670

[22] Filed: Mar. 11, 1993

[30] Foreign Application Priority Data

Mar. 11, 1992 [EP] European Pat. Off. ........ 92302042.4

[51] Int. Cl.$^5$ ..................... A23C 11/08; A23L 1/19; A23D 7/00
[52] U.S. Cl. ..................... 426/568; 426/564; 426/570; 426/602; 426/604; 426/613
[58] Field of Search ............... 426/564, 568, 570, 602, 426/604, 613

[56] References Cited

U.S. PATENT DOCUMENTS 3,883,670  5/1975  Pennings et al. .
4,748,028  5/1988  McKenna et al. .
4,808,334  2/1989  Ezaki et al. .
5,149,557  9/1992  Morrison et al. .................. 426/602

FOREIGN PATENT DOCUMENTS 0469656  2/1992  European Pat. Off. .
1245270  4/1963  Fed. Rep. of Germany .

OTHER PUBLICATIONS

Chemical Abstracts, vol. 107, No. 25, Dec. 25, 1987, Abstract No. 235179g "Egg-Yolk-Containing Whipped Cream Substitutes".

*Primary Examiner*—Donald E. Czaja
*Assistant Examiner*—Mary S. Mims
*Attorney, Agent, or Firm*—Cushman, Darby & Cushman

[57] ABSTRACT

Our invention concerns with ready-to-use non dairy creams with good storage stability, containing egg yolk and eggwhite. In fact, the composition of our creams is:

0.05–0.5 wt % emulsifier
0.5–8.0 wt % egg yolk
0.01–1.0 wt % caseinate
0.5–4.0 wt % egg white
0–1.0 wt % thickener
1–10 wt % carbohydrate
25–45 wt % fat
balance: water The creams are sterile and display a water activity of 0.95–1.0.

Also a process for the preparation of such non dairy creams is part of the invention.

11 Claims, No Drawings

STABILIZED, WHIPPABLE NON-DAIRY CREAMS

A great number of non-dairy creams, including sterilized non-dairy creams that are ready to use and whose storage stability has been increased by a sterilization treatment, are disclosed in literature. It has, however, remained a general problem to come to a sterilized non-dairy cream that displays a good whipping performance and at the same time a good mouthfeel.

At first, the problem was overcome by making a concentrated mixture containing vegetable fat, emulsifier, egg yolk, egg white, a thickener (xanthan gum), polyalcohols and sugar. This mixture had a low water activity ($A_w < 0.85$). The product obtained had a good storage stability. However, this product was not ready for use as it had to be diluted with water or milk prior to consumption (cf. U.S. Pat. No. 3,883,670 or GB 1,432,364). Therefore, this product still did not meet the requirements set to a ready-to-use product which has a good taste, which needed the presence of egg yolk and which could be sterilized (because of the inherently high $A_w$ value).

From JP 62/215,356 egg yolk containing whipped substitutes are known, that can be sterilized by super high temperatures. These products, however, do not contain eggwhite, while a complicated emulsifier is required ($\leq 3$ components) and an inorganic salt must be present.

We have now found a ready-to-whip, non-dairy cream displaying a good shelf life as a result of a sterilization treatment, and containing both egg yolk and egg white, whereas polyalcohols and inorganic salts are absent. These produces display excellent whipping properties, in particular because of the presence of the egg white.

Therefore, our invention concerns whippable, non-dairy creams comprising a water-continuous fat emulsion having a fat content of 25–45 wt. %, wherein the fat consists at least partly of vegetable fat and wherein 0.05–0.5 wt. % of an emulsifier system; 0.5–8.0 wt. % of egg yolk; 0.01–1.0 wt. % of a caseinate; 0.5–4.0 wt. % of egg white and 1–10 wt. % of a carbohydrate (=a sugar) are present. As a result of the composition chosen, i.e. components and their amounts, the NDC had an $A_w$ value of 0.95–1.0. Because of these high $A_w$ values, a sterilization treatment was necessary. This treatment is preferably carried out in such a way that $F_0$ values of at least 2 minutes, preferably of at least 5 minutes are obtained, $F_0$ being defined as the extrapolated time required to come to the same stability upon sterilization at 121° C.

In our non-dairy creams also a thickener can be present. The amount of the thickener (0–1.0 wt. %) is not critical but preferred amounts are 0.01–0.5 wt. %. Any thickener, such as xanthan gum, guar gum, locust bean gum or carrageenan, may be used, but a preference is expressed for the use of xanthan gum.

Essential in our composition is the presence of the caseinate, preferably Na-caseinate. Other caseinates may, however, also be applied. The caseinate needs to be present to achieve the desired whippability. The amount of caseinate is 0.01–1.0 wt. %, preferably 0.05–0.5 wt. %.

The emulsifier system may consist of any type of emulsifier, e.g. monoglycerides, both from saturated and unsaturated fatty acids, polyglycerol esters, lactic acid glycerides, lecithins, tartaric acid esters, including the acety/derivatives (=DATA esters), or mixtures of these can be applied. We prefer, however, to use a simple emulsifier system, consisting of the monoglycerides of saturated or unsaturated $C_{16}$–$C_{18}$ fatty acids. The emulsifier system is present in amounts of 0.05–0.5 wt. %, amounts of 0.1–0.2 wt. % being preferred.

The egg yolk can be fresh egg yolk, but also dried egg yolk powder diluted with water can be applied. The amount of egg yolk is 0.5–8.0 wt % preferably 1.0–5.0 wt %.

The egg white from fresh eggs or from dried egg products can also be applied. The amount is 0.5–4.0 wt. %, preferably 1.0–2.5 wt. %.

Good results are obtained when whole, fresh eggs are applied. In this case, the egg yolk and the egg white will be incorporated simultaneously.

The fats that are suitably applied in our invention can be chosen from, for example, soybean oil, hardened soybean oil, palmkernel oil, hardened palmkernel oil, coconut oil, interesterified coconut oil, hardened coconut oil, palm oil, hardened palm oil, mixtures thereof, and interesterified (both chemically and enzymically) mixtures. However, other vegetable fats can also be used, either alone or in combination with the fats mentioned above. In order to obtain the desired mouthfeel, it is preferred that the fat applied should display an N-profile (unstab., NMR-pulse) of $N_{10} \leq 80$ and $N_{35}=0$–$3$, preferably $N_{10}>95$ and $N_{35}=0$–$2$. Preferred fats consist at least 50 wt. % of lauric fats, such as the palmkernel or coconut fats or fractions thereof. Hardened and/or interesterified mixtures thereof are also very suitable.

In order to obtain a healthier character, it is preferred that our fats contain mono-unsaturated and/or polyunsaturared fatty acid residues (i.e. MUFA and PUFA fats).

The amount of fat is 25–45 wt %, preferably 25–35 wt. %, a range of 28–33 wt. % being most preferred.

As a result of a proper selection of the components and their amounts, the water activity of our NDC's is 0.95–1.0. Such high $A_w$ values, however, lead to short shelf lives. In order to obtain products having a longer shelf life, our products had to be sterilized in order to obtain an $F_0$ value of preferably at least 5 minutes.

In order to acquire a desired taste, e.g. a more dairy-like taste, a fruit taste, a chocolate taste or a vanilla taste, it is preferred that our non-dairy creams should contain a flavour. Flavours such as cream flavour, butter flavour, strawberry flavour, cherry flavour, vanilla or chocolate flavour may be incorporated into our compositions.

A dairy-like taste can also be achieved by incorporation, e.g., of buttermilk powder, skimmed milk powder or a synthetic product, such as our "concentrate de beurre".

In order to improve the color of the creams, colorants may be included in the cream compositions.

Our non-dairy creams can be stored for at least 3 months without deterioration of their physical or organoieptic properties occurring. The creams are whippable within acceptable whipping times (about 4–10 minutes with a Kenwood Chief household whipping machine). Overruns of the whipped creams are very acceptable, in general ranging between 100 and 350%.

Although the stand-up of our whipped creams is quite satisfactory in general, it can be improved by adding a standing agent, in particular gelatin, to the cream. We found, however, that addition of gelatin to our whipped creams sometimes led to coagulation problems. These problems, however, could be overcome by adding milk proteins, e.g. as milk or milk powder, to our composition prior to whipping of the cream. In that case the stand-up was improved and the overrun was left.

The conditions applied for the sterilization are chosen such that $F_0$-values of preferably at least 5, are obtained. For this purpose, temperature/time combinations should be selected. The higher the temperature, the shorter will be the time required. Examples of T/$t$-combinations that yield good results are, e.g. 1-30 seconds at 140°-145° C.

The heating and cooling for the sterilization treatment can be carried out both by direct heat transfer, by introducing superheated steam, and by indirect heat transfer in a heat exchanger. Indirect heating was found to give better results. For example, the flavours are better retained in the products.

The optimal process for the manufacturing of our non-dairy creams consists of the following steps:
- a premix is made of the components of the non-dairy creams;
- this premix is heated to 50°-60° C.;
- a homogenization step of this premix, preferably under pressure, can be carried out at this temperature. However, this step is not imperative;
- further heating of the mixture to the sterilization temperature is carried out;
- the heated product is sterilized at 135°-150° C. for 1 second - 5 minutes, preferably 10-20 seconds at 140°-145° C.;
- after the sterilization step, the product is cooled to 50°-60° C.;
- a homogenization step is carried out, preferably under pressure;
- the homogenized product is cooled and packed aseptically at temperatures below 15° C., preferably below 12° C.;
- the packed product is stored at temperatures below 20° C.

As mentioned before, the heating and cooling for the sterilization step is preferably carried out in a tubular heat exchanger.

Although the best results were obtained by applying two homogenization steps, the first step prior to heating to above 70° C., preferably at pressures of 50-150 bar, and the second step after cooling of the sterilization at pressures of 100-200 bar, the first homogenization step could be omitted.

It is pointed out here, that similar processes for the production of whippable non-dairy creams or coffee whiteners are known from e.g. EP 469 656; U.S. Pat. No. 4,748,028 or U.S. Pat. No. 4,808,334. However, the products prepared according to this prior art do not contain simultaneously egg yolk and egg white. It is the simultaneous presence of these two components that complicates the processing.

EXAMPLE

A premix was prepared from the components listed in Table I.

TABLE I

| | |
|---|---|
| Fat (mixture of soybean, palmkernel, coconut and palm oil fats) | 35 wt. % |
| Saturated monoglyceride ($C_{16}/C_{18}$) | 0.07 wt. % |
| Egg yolk (including 40% sugar) | 4.2 wt. % |
| Na-caseinate | 0.45 wt. % |
| Egg white (including 40% sugar) | 2.8 wt. % |

TABLE I-continued

| | |
|---|---|
| Xanthan gum | 0.2 wt. % |
| Sugar | 3.5 wt. % |
| Flavour | 0.03 wt. % |
| Water | 53.8 wt. % |

The N-profile of the fat mixture was $N_{20}=46$; $N_{30}=6$ and $N_{35}=2$.

The premix was heated to 55° C., homogenized at 100 bar, heated to 80° C., sterilized by indirect heat exchange in a tubular heat exchanger at 140° C. ($T_{heat\ exch.}=150°$ C.) for 20 seconds. The product was cooled to 55° C., homogenized at 200 bar, and cooled further to 10° C. The $F_0$-value was 7 minutes.

The product was stored for 12 weeks at 10° C. and 20° C. Whipping time (t) and density (v) of the cream expressed in g/1 were measured after 2, 4, 6 and 12 weeks, respectively.

The results are given in Table II.

TABLE II

| Storage temperature | 10° C. t(min) | 10° C. v(g/l) | 20° C. t(min) | 20° C. v(g/l) |
|---|---|---|---|---|
| Storage time: | | | | |
| 2 weeks | 8 | 340 | 8 | 350 |
| 4 weeks | 6 | 360 | 5.5 | 350 |
| 6 weeks | 9 | 320 | 6 | 310 |
| 12 weeks | 8 | 340 | 8 | 360 |

The results illustrate that the properties of the NDC's as measured are not (or barely) affected by storage temperature or by storage time.

We claim:

1. A ready-to-use sterilized whippable non-dairy cream comprising (1) a water-continuous fat emulsion having a fat content of 25-45 wt. %, wherein the fat consists of at least partly of vegetable fat, (2) 0.05-0.5 wt. % of an emulsifier (3) 0.5-8 wt. % of egg yolk, (4) 0.01-1.0 wt. % of a caseinate, (5) 0.5-4.0 wt. % of egg white, (6) 0-1.0 wt. % of a thickener, and (7) 1-10 wt. % of a carbohydrate.

2. Whippable non-dairy cream according to claim 1, wherein the cream displays a water activity of 0.95-1.0.

3. Whippable non-dairy cream according to claim 1, wherein the fat is chosen from the group consisting of soybean oil, hardened soybean oil, palmkernel oil, hardened palmkernel oil, interesterified coconut oil, hardened coconut oil, palm oil or hardened palm oil, mixtures thereof, and interesterified mixtures of these fats.

4. Whippable non-dairy cream according to claim 3, wherein the fat consists at least 50 wt. % of lauric fats comprising palmkernel fraction or coconut oil fractions and hardened and interesterified fractions thereof.

5. Whippable non-dairy cream according to claim 3, wherein the fat used displays an N-profile of $N_{10} \leq 80$ and $N_{35}=0-3$.

6. Whippable non-dairy cream according to claim 3, wherein the fat also contains polyunsaturated fatty acid triglycerides or mono-unsaturated fatty acid triglycerides.

7. Process for the preparation of a ready-to-use sterilized non-dairy cream wherein a premix is made of (1) a water-continuous fat emulsion having a fat content of 25-45 wt. %, (2) an emulsifier, (3) egg yolk, (4) caseinane, (5) egg white, (6) thickener and (7) a carbohydrate, which is heated to 50°-60° C., further heated to sterilization temperature and sterilized at 135°-150° C. for 1 second—5 minutes, cooled to 50°-60° C., homogenized under pressure, cooled and packed aseptically at T<15° C. and stored at T<20° C.

8. Process according to claim 7, wherein the heating and cooling is carried out by indirect heat transfer an a tubular heat exchanger.

9. Process according to claim 7, wherein the first homogenization step is carried out at 50–150 bar, while the second homogenization step is carried out at 100–200 bar.

10. A process according to claim 7 wherein the premix is homogenized under pressure following heating to 50°–60° C.

11. A sterilized whippable non-dairy cream according to claim 1 wherein (2) is a saturated or unsaturated monoglycerol ester of a fatty acid, (4) is Na-caseinate, and (6) is xanthan gum.

* * * * *